Figure 1:
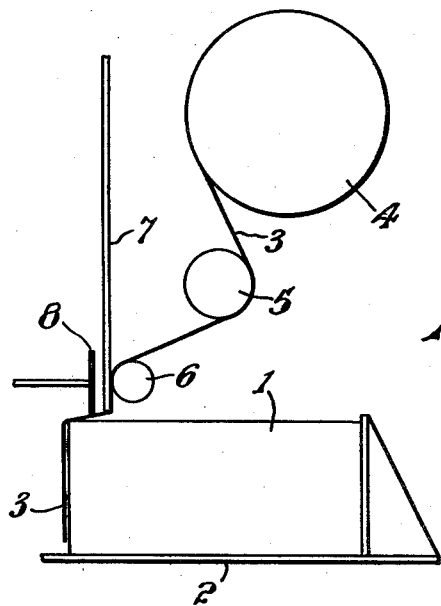

March 27, 1962 G. E. WILLIAMS ET AL 3,026,657
SLICING AND INTERLEAVING MACHINES
Filed May 9, 1958 5 Sheets-Sheet 1

INVENTORS
GEOFFREY ERNEST WILLIAMS
WILLIAM THORNTON DOW
BY

THEIR ATTORNEYS

March 27, 1962  G. E. WILLIAMS ET AL  3,026,657
SLICING AND INTERLEAVING MACHINES
Filed May 9, 1958  5 Sheets-Sheet 3

INVENTORS
GEOFFREY ERNEST WILLIAMS
WILLIAM THORNTON DOW
BY
THEIR ATTORNEYS

March 27, 1962  G. E. WILLIAMS ET AL  3,026,657
SLICING AND INTERLEAVING MACHINES
Filed May 9, 1958  5 Sheets-Sheet 5

INVENTORS
GEOFFREY ERNEST WILLIAMS
WILLIAM THORNTON DOW
BY
THEIR ATTORNEYS 3,026,657
SLICING AND INTERLEAVING MACHINES
Geoffrey Ernest Williams, Little Neston, and William Thornton Dow, Upton, England, assignors to Lever Brothers Company, New York, N.Y., a corporation of Maine
Filed May 9, 1958, Ser. No. 734,263
18 Claims. (Cl. 53—23)

This invention relates to the slicing and interleaving of plastic substances in the form of bars and especially to the slicing and interleaving of blocks of puff pastry margarine.

Puff pastry margarine is normally sold in bulk in the form of blocks. It would, however, be more convenient to the user (i.e. the baker, if the blocks could be supplied sliced.

It is an object of the present invention to provide a machine for cutting a block of puff pastry margarine into slices and interleaving it with suitable sheet material so that each slice is readily detachable from the adjacent slice.

The present invention provides a machine for slicing and interleaving a plastic substance in the form of a bar comprising support means for supporting the bar, a reciprocable blade, advancing means for intermittently advancing the leading surface of the unsliced part of the bar a predetermined distance past the blade, means for reciprocating the blade after operation of the advancing means to cut a slice from the unsliced part of the bar and to insert interleaving sheet material in the cut, severing means for severing the interleaving sheet material after operation of the advancing means but before the next reciprocation of the blade, the operating part of the severing means being disposed on the leading side of the blade and spaced therefrom by a distance not greater than the predetermined distance.

When passing the blade in the direction of advancement the trailing side of the blade is past before the leading side.

The severing means may comprise a cutter wheel, means for rotating the cutter wheel, and means for moving the cutter wheel in a direction transverse to the direction of advancement. The means for rotating and the means for moving the cutter wheel are preferably such that during the severing operation the peripheral speed of the cutter wheel is greater than the speed of movement of the axis of the wheel. The means for moving the cutter wheel may comprise a lever on which the cutter wheel is rotatably mounted, the lever being pivoted to a radius arm which is pivotable in a plane transverse to the direction of advancement. The means for rotating the cutter wheel may comprise a drive wheel secured to the cutter wheel and a track for the drive wheel to roll on. The drive wheel may be resiliently urged into engagement with the track during the severing operation. The drive wheel may be a pinion and the track a rack.

Alternatively, the severing could be achieved by any other suitable means such as a guillotine.

The support means preferably comprises a movable platform and the advancing means can then be arranged to advance the platform. The platform may be comprised by an endless belt conveyor. Alternatively, the support means may conveniently comprise a stationary platform or a plurality of rotatable rollers.

Guide means may be provided for guiding interleaving sheet material towards the trailing side of the blade. The guide means may conveniently comprise a rotatably mounted roller urged towards the trailing side of the blade. In use a strip of interleaving sheet material can pass from a roll of the material, between the guide means roller and the trailing side of the blade, and then past the cutting edge of the blade to the leading side of the blade.

The cutting edge of the blade is preferably rough.

The predetermined distance of advancement may be equal to the desired thickness of each slice, although it has been found preferable in some cases to have this predetermined distance slightly greater than the desired slice thickness in order to take account of the thickness of the blade.

The invention also provides a method of slicing and interleaving plastic substance in the form of a bar comprising reciprocating a blade to cut a slice from the bar and at the same time to insert in the cut interleaving sheet material from a supply of the material, advancing the bar past the blade so that at least part of the inserted material adhering to the bar causes more of the material to be drawn from the supply past the blade, and thereafter repeating the cycle of operations.

The invention further provides a method of slicing and interleaving plastic substance in the form of a bar comprising cutting a slice from the bar and at the same time inserting in the cut an interleaf of interleaving sheet material from a supply of the material, advancing the bar a predetermined distance, and then severing the interleaf from the supply, and thereafter repeating the cycle of operations.

The interleaf may be constituted by one layer or, alternatively, by two discrete layers.

The invention further provides a method of slicing and interleaving plastic substance in the form of a bar comprising advancing the unsliced portion of the bar so that its leading face, which has a strip of interleaving material adhering thereto, passes a blade and draws more of the strip from a supply of the strip past the blade, severing the strip in a position between the leading face of the unsliced portion and the blade, moving the blade to cut a slice from the unsliced portion and to draw a part of the strip from the supply into the cut, withdrawing the blade whilst leaving said part of the strip in the cut adhering to the new leading face of the unsliced portion, and thereafter repeating the cycle of operations. The strip may comprise two distinct layers.

The bar may be in the form of a block or, alternatively, the bar may be continuously formed as it is advanced. The advantage of using a block is that the block can be of a predetermined weight so that the sliced and interleaved block will then contain a predetermined weight of plastic material.

The invention also provides a block comprising a plurality of slices of plastic substance, any two adjacent slices having two discrete layers of interleaving sheet material between them.

The interleaving sheet material is preferably vegetable parchment although it may be cellophane, which may conveniently be coloured so that tears are readily detectable, or any other suitable material.

The plastic substance may be edible fat. In practice the invention has been found particularly useful when the edible fat is puff pastry margarine.

In the case of a sliced and interleaved block of puff pastry margarine in which each interleaf is constituted by a single sheet of vegetable parchment, each slice can be readily detached from the adjacent slice.

In the case when each interleaf is constituted by two discrete sheets of vegetable parchment any two adjacent slices of margarine can readily be separated with a sheet of the interleaf between them adhering to the adjacent face of each slice. If a sheet of vegetable parchment has been stuck on each end face of the sliced and interleaved block then any two adjacent slices are readily separable with a sheet of vegetable parchment adhering to each face of each slice, the slices being separated without the necessity of tearing a sheet of parchment from either face of either slice. The only separation that may be necessary between margarine and parchment adhering thereto is at the bottom of the interleaf where the bottom of one sheet may be tucked over the bottom of the other sheet due to the way in which the interleaf was inserted. This arrangement not only permits the ready separation of the slices but also provides the separated slices in a more convenient and hygienic form for handling.

Figure 2:
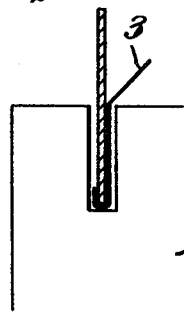
Figure 3:
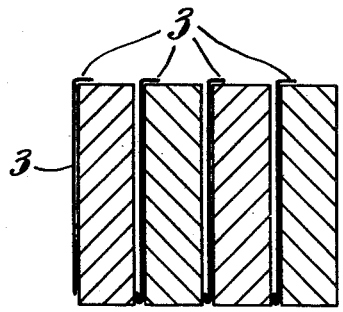
Figure 4:
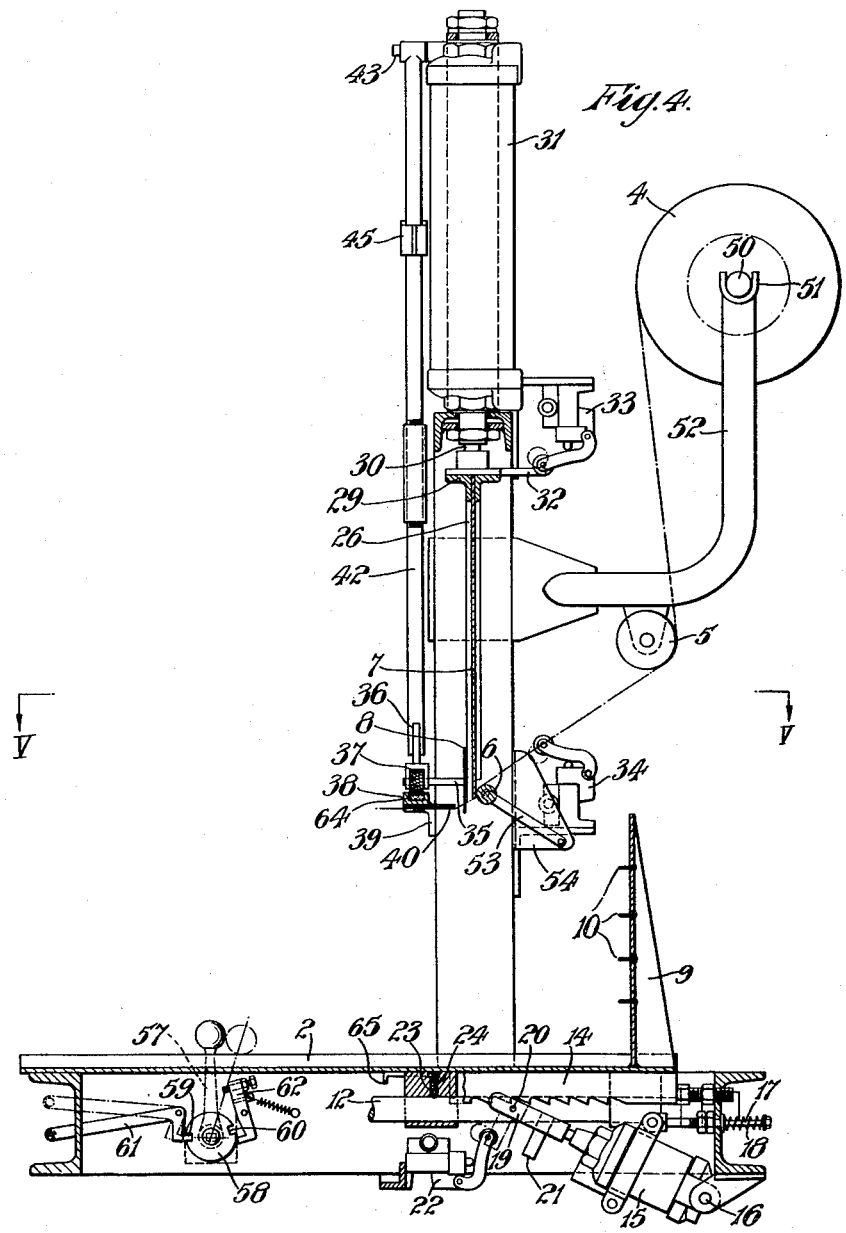
Figure 5:
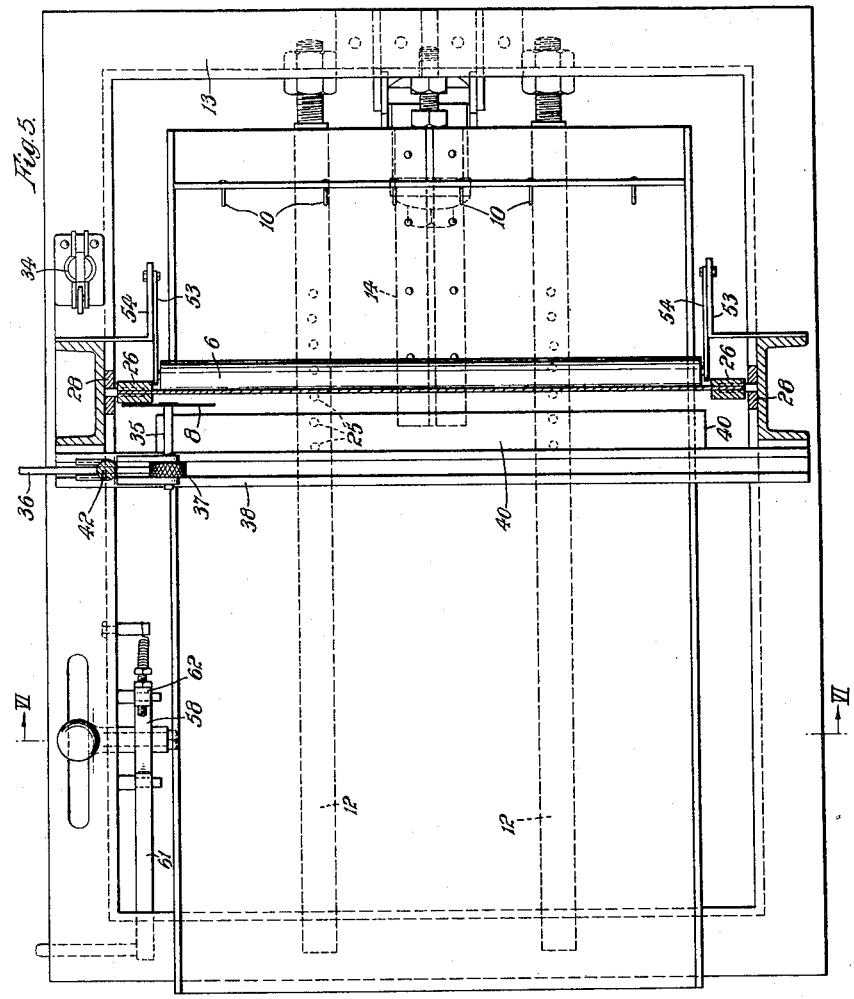
Figure 6:
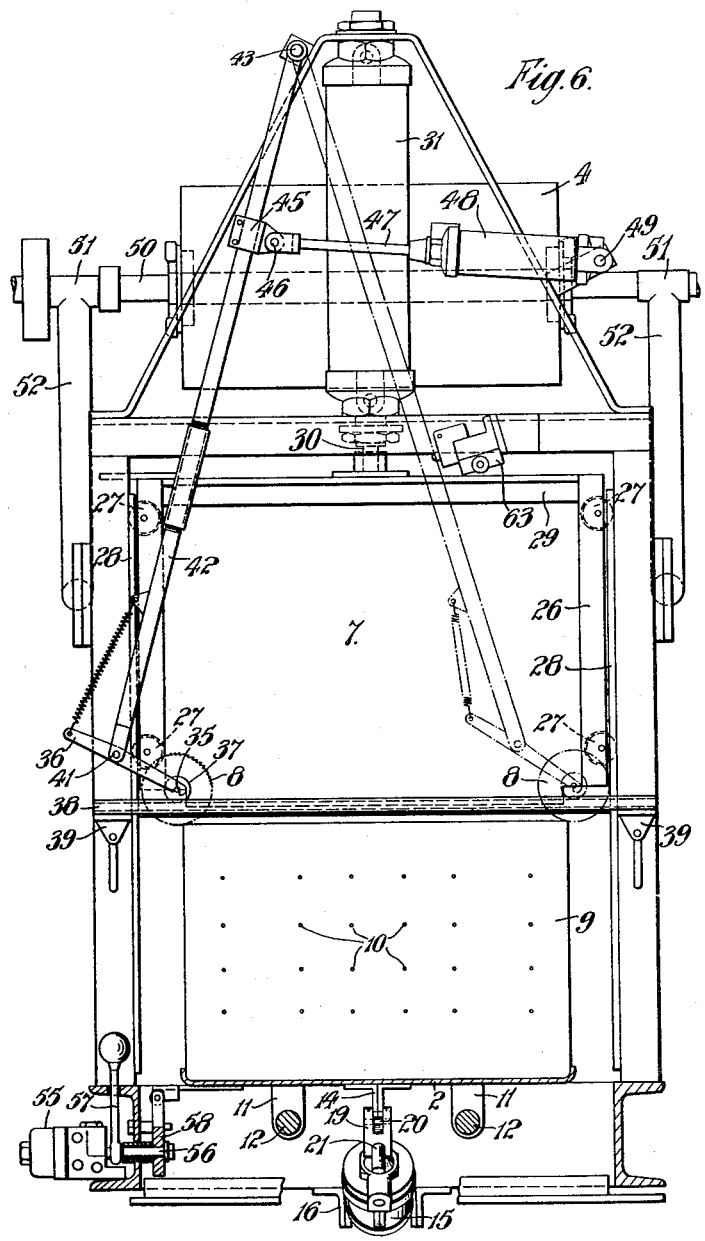
Figure 7:
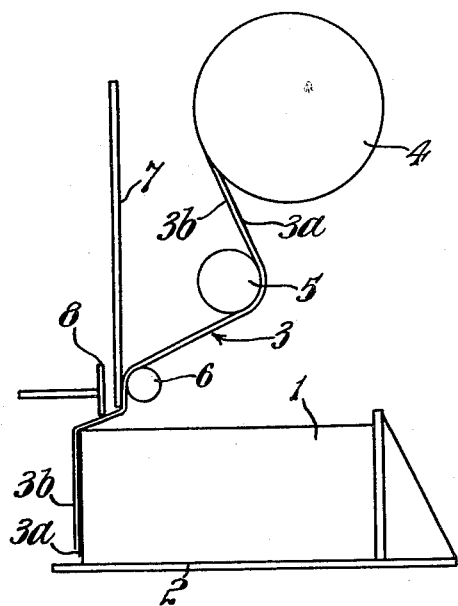
Figure 8:
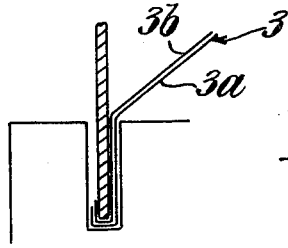
Figure 9:
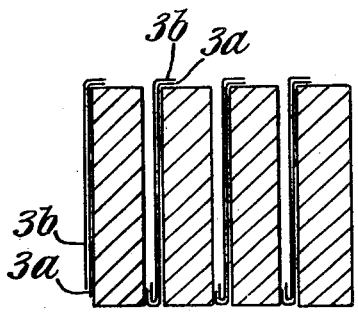

Preferred embodiments of the invention will now be described with reference to the accompanying drawings in which:

FIGURE 1 shows schematically an elevation of a machine according to the invention being used with interleaving material constituted by a sheet of vegetable parchment, FIGURE 2 shows schematically on an enlarged scale the descent of the blade of the machine of FIGURE 1 through a block, the interleaving material being a sheet of vegetable parchment, FIGURE 3 shows schematically a cross-section of a part of the sliced and interleaved block of FIGURE 2, each interleaf comprising a sheet of vegetable parchment, FIGURE 4 shows a vertical cross-section of the machine shown in FIGURE 1, FIGURE 5 shows a horizontal cross-section on a larger scale of the machine on the line V—V, FIGURE 4, FIGURE 6 shows a vertical cross-section on the same scale as FIGURE 4 of the machine on the line VI—VI of FIGURE 5, FIGURE 7 shows schematically an elevation as in FIGURE 1 of the same machine being used with interleaving material comprising two distinct sheets of vegetable parchment, FIGURE 8 is a similar view to FIGURE 7 showing the machine being used with interleaving material comprising two distinct sheets of vegetable parchment, FIGURE 9 shows schematically a cross-section of part of a sliced and interleaved block in which each interleaf comprises two discrete sheets of vegetable parchment.

FIGURES 1 and 7 both show a block 1 of puff pastry margarine, to be sliced and interleaved, supported on a platform 2. The interleaving sheet material is fed in the form of a strip 3 from a roll 4 via a guide roller 5 and a pressure roller 6. The strip is pulled between the trailing side of a reciprocable slicer blade 7 and the pressure roller 6, and then stuck to the leading face, i.e. the left hand face in FIGURES 1 and 7, of the block 1. The leading face of the block is then advanced a predetermined distance past the blade 7 drawing the strip with it to the position shown in FIGURES 1 and 7. The strip 3 is then severed by a rotary cutter 8, which is rotated and simultaneously moved across the block in a direction parallel to the plane of the blade.

Due to the fact that the rotary cutter is disposed a small distance to the left of the slicer blade 7, a small portion of the strip remains projecting beyond the slicing edge of the blade. The blade 7 then descends and draws with it more of the strip, that portion of the strip which projected beyond the blade having become tucked round the leading side of the blade during its descent. The blade descends until it touches the platform and is then retracted upwards. During the upward movement the inserted part of the strip is prevented from being retracted with the blade by its adherence to the margarine.

The platform is again advanced past the blade the predetermined distance, which is equal to the desired thickness of one slice, the inserted part of the strip adhering to the leading face of the unsliced part of the block causing more of the strip to be drawn past the blade 7.

The severing operation is again performed to sever the inserted part from the supply of the strip. The blade thereupon again descends to slice and interleave the block. The slicing and interleaving is continued until the whole block is sliced and interleaved.

FIGURES 1 and 2 show the machine being used with a strip comprising a single sheet of vegetable parchment. In FIGURE 2 the portion of the sheet tucked round the leading side of the blade 7, as the blade descends, is clearly shown. FIGURE 3 shows part of the sliced and interleaved block when the strip 3 used comprised a single sheet.

FIGURES 7 and 8 show the machine being used when the strip 3 comprises two distinct sheets 3a, 3b of vegetable parchment, FIGURE 8 showing both sheets tucked round the leading side of the blade 7 as the blade descends. FIGURE 9 shows part of the sliced and interleaved block when the strip 3 used comprised two distinct sheets. In this case each interleaf is constituted by two discrete layers 3a, 3b.

For the sake of clarity the width of the cut formed by the blade in the margarine has been exaggerated in FIGURES 2, 3, 8, and 9; in fact the clearance shown does not exist. Also for clarity the gap between the two distinct sheets 3a, 3b in FIGURES 7 and 8, and between the two discrete layers 3a, 3b in FIGURE 9 has been exaggerated.

Although FIGURES 3 and 9 show each interleaf passing right through the block this result may not always be obtained as the strip sometimes tends to slip relative to the blade during insertion. In practice the blade, apart from slicing the block, carries the strip a sufficient distance into the block to make the slices readily separable. The tendency for relative slip is reduced by the slicing edge, apart from being blunt, being rough, and also by using vegetable parchment as the interleaving material. The slicing edge can, for example, have been roughened by a knurling tool. The tendency for relative slip can be reduced still further by feeding the strip 3 to the pressure roller 6 so that a take-up loop is provided between the roll 4 and the guide roller 5. This can be achieved by rotating the roller 4 by external means.

The machine will now be described in greater detail with reference to FIGURES 4–6. The platform 2, which is provided with a back rest 9 having studs 10, is slidably mounted by means of blocks 11 on two runner bars 12 secured to the frame 13. A ratchet rack 14 is fixed to the under-side of platform 2. An air cylinder 15 is pivotally mounted at 16 below the platform 2 to the frame 13. A bolt 17, which is pivotally secured to the air cylinder 15 and passes through frame 13, is provided with a helical spring 18. The piston rod of the air cylinder 15 terminates in a fork 19 provided with a pin 20. The stroke of the piston is twice that of the movement required. The arrangement is such that the first half of the outward movement of the piston is free movement; the pin 20 then engages the ratchet rack 14 so that the piston advances the platform forward, i.e., to the left, during the second half of its movement. During the second half of its movement, the cylinder rotates slightly about pivot 16 in an anti-clockwise direction. The pin 20 is held in engagement with the ratchet rack by spring 18. The fork is also provided with a trip bar 21 which is arranged to actuate a pilot valve 22 when the piston rod is in its extreme outward position.

As the pin 20 does not engage the ratchet rack 14 when the piston rod is in its retracted position, means are provided for locating the platform. For this purpose, each block 11 contains a ball 23 which is urged by means of a spring 24 into equi-spaced blind holes 25 in the corresponding bar 12.

The blade 7, which consists of a 0.16 cm. stainless steel plate, is secured in a frame 26 having wheels 27 which project into two vertical guides 28 secured to vertical members 70 of a main frame. The cross member 29 of the blade frame is attached to the piston rod 30 of an air cylinder 31. The cross member 29 is also provided with a trip lever 32, which actuates an air valve 33 when the blade is in its upper position and an air valve 34 when the blade is in its lower position.

means for intermittently advancing the leading face of the unsliced part of the bar a predetermined distance past the blade, means for reciprocating the blade after operation of the advancing means to cut a slice from the unsliced portion of the bar and to insert interleaving sheet material in the cut, a cutter wheel for severing the interleaving sheet material, the cutter wheel being disposed on the leading side of the blade and spaced therefrom by a distance not greater than the predetermined distance, a lever on which the cutter wheel is rotatably mounted, a radius arm pivotable in a plane transverse to the direction of advancement, the lever being pivoted to the radius arm, and means for rotating the cutter wheel.

5. A machine as claimed in claim 4 in which the means for rotating the cutter wheel comprises a drive wheel secured to the cutter wheel and a track for the drive wheel to roll on.

6. A machine for slicing and interleaving plastic substance in the form of a bar comprising a movable platform for supporting the bar, a reciprocable blade, advancing means for intermittently advancing the platform a predetermined distance past the blade, means for reciprocating the blade after operation of the advancing means to cut a slice from the unsliced portion of the bar and to insert interleaving sheet material in the cut, severing means for severing the interleaving sheet material after operation of the advancing means but before the next reciprocation of the blade, the operating part of the severing means being disposed on the leading side of the blade and spaced therefrom by a distance not greater than the predetermined distance.

7. A machine as claimed in claim 6 having guide means for guiding the interleaving sheet material towards the trailing side of the blade.

8. A machine as claimed in claim 7 in which the guide means comprises a rotatably mounted roller urged towards the trailing side of the blade.

9. A machine for slicing and interleaving plastic substance in the form of a bar comprising a movable platform for supporting the bar, a reciprocable blade, advancing means for intermittently advancing the platform a predetermined distance past the blade, means for reciprocating the blade after operation of the advancing means to cut a slice from the unsliced portion of the bar and to insert interleaving sheet material in the cut, a cutter wheel for severing the interleaving sheet material, the cutter wheel being disposed on the leading side of the blade and spaced therefrom by a distance not greater than the predetermined distance, means for rotating the cutter wheel, and means for moving the cutter wheel in a direction transverse to the direction of advancement to sever the interleaving sheet material after operation of the advancing means but before the next reciprocation of the blade.

10. A machine for slicing and interleaving plastic substance in the form of a bar comprising a movable platform for supporting the bar, a reciprocable blade, advancing means for intermittently advancing the platform a predetermined distance past the blade, means for reciprocating the blade after operation of the advancing means to cut a slice from the unsliced portion of the bar and to insert interleaving sheet material in the cut, guide means for guiding the interleaving sheet material towards the trailing side of the blade, a cutter wheel for severing the interleaving sheet material, the cutter wheel being disposed on the leading side of the blade and spaced therefrom by a distance not greater than the predetermined distance, means for rotating the cutter wheel, and means for moving the cutter wheel in a direction transverse to the direction of advancement to sever the interleaving sheet material after operation of the advancing means but before the next reciprocation of the blade.

11. A method of slicing and interleaving plastic substance in the form of a bar comprising cutting a slice from the bar with a blade and at the same time inserting in the cut interleaving sheet material from a supply of the material, causing relative displacement between the bar and the blade to bring them to a position ready for the next slice to be cut, then severing the inserted interleaving material from the supply at a point between the first-mentioned slice and the blade, and thereafter repeating the cycle of operations.

12. A method of slicing and interleaving plastic substance in the form of a bar comprising cutting a slice from the bar with a blade and at the same time inserting in the cut part of a strip of interleaving sheet material from a supply of the material, the strip comprising two unconnected layers, then causing relative displacement between the bar and the blade to bring them to a position ready for the next slice to be cut, then severing the inserted part of the strip from the supply at a point between the first-mentioned slice and the blade to form an interleaf comprising two discrete layers, and thereafter repeating the cycle of operations.

13. A method of slicing and interleaving plastic substance in the form of a bar comprising advancing the unsliced portion of the bar so that its leading face, which has a strip of interleaving material adhering thereto, passes a blade and draws more of the strip from a supply of the strip past the blade, severing the strip in a position between the leading face of the unsliced portion and the blade, moving the blade to cut a slice from the unsliced portion and to draw a part of the strip from the supply into the cut, withdrawing the blade whilst leaving said part of the strip in the cut adhering to the new leading face of the unsliced portion, and thereafter repeating the cycle of operations.

14. A method of slicing and interleaving plastic substance in the form of a bar comprising advancing the unsliced portion of the bar so that its leading face, which has adhering thereto a strip constituted by two distinct layers of interleaving sheet material, passes a blade and draws more of the strip from a supply of the strip past the blade, severing the strip in a position between the leading face of the unsliced portion and the blade, moving the blade to cut a slice from the unsliced portion and to draw a part of the strip from the supply into the cut, withdrawing the blade whilst leaving said part of the strip in the cut adhering to the new leading face of the unsliced portion, and thereafter repeating the cycle of operations.

15. A method of slicing and interleaving a block of plastic substance comprising advancing the unsliced portion of the bar so that its leading face, which has a strip of interleaving material adhering thereto, passes a blade and draws more of the strip from a supply of the strip past the blade, severing the strip in a position between the leading face of the unsliced portion and the blade, moving the blade to cut a slice from the unsliced portion and to draw a part of the strip from the supply into the cut, withdrawing the blade whilst leaving said part of the strip in the cut adhering to the new leading face of the unsliced portion, and thereafter repeating the cycle of operations.

16. A method of slicing and interleaving a block of plastic substance comprising advancing the unsliced portion of the block so that its leading face, which has adhering thereto a strip constituted by two distinct layers of interleaving sheet material, passes a blade and draws more of the strip from a supply of the strip past the blade, severing the strip in a position between the leading face of the unsliced portion and the blade, moving the blade to cut a slice from the unsliced portion and to draw a part of the strip from the supply into the cut, withdrawing the blade whilst leaving said part of the strip in the cut adhering to the new leading face of the unsliced portion, and thereafter repeating the cycle of operations.

17. A method of slicing and interleaving a block of edible fat comprising advancing the unsliced portion of The rotary cutter 8 is secured to a spindle 35 which is rotatably mounted in the forked end of a lever 36. Spindle 35 has also secured to it a knurled bush 37 which runs in a horizontal track 38 secured at its ends by brackets 39 to the vertical members 70 of the main frame. Thus the rotary cutter is situated on the leading side of the blade 7 in the direction of advancement of the platform with the operating edge of the rotary cutter slighly below the slicing edge of blade 7 when that blade is in its upper position. The brackets 39 also serve to secure a horizontal plate 40. The lever 36 is pivoted at 41 to a radius arm 42 which pivots about pivot 43. A spring 44 having one end attached to the radius arm and the other to an end of lever 36 maintains the knurled bush 37 in contact with a strip 64 of rubber fixed in the horizontal track 38. The radius arm 42 is connected by a clamp 45 and pin 46 to the piston rod 47 of air cylinder 48. Air cylinder 48 is pivotally connected at 49 to a suitable frame member secured to the vertical member 70.

The roll 4 of the interleaving material in the form of a strip 3 (the strip comprising either a single layer or two distinct layers as previously described) is mounted on a mandrel 50 supported in half bearings 51 secured to frame member 52. The strip is guided round the guide roller 5, which is also secured to the frame member 52, over the pressure roller 6, which is rotatably secured at each of its ends, to a lever 53 which is pivotally mounted in brackets 54, and under plate 40.

The process is set in motion by a hand control valve 55 mounted below the platform 2. The spindle 56 of the control valve 55 has secured to it a control lever 57 and a disc 58 having two square cut-out portions 59, 60 in its periphery. When the valve 55 is in the "off" position, it is locked in that position by means of a detent of bell crank 61, which engages in aperture 59; when the valve is in the "on" position, it is locked in that position by a detent on a spring loaded pivoted lever 62 which engages in aperture 60.

In operation, the platform 2 is moved back to its extreme right hand position. The block 1 of margarine is then placed on the platform 2 and pushed against the back rest 9. The strip 3 is then pulled downwards and lightly tapped against the leading face of the block to which it adheres.

The free end of bell crank 61 is then depressed, thereby unlocking the disc 58. The control lever 57 is then moved to the right to turn the spindle 56 clockwise (as seen in FIG. 4) until the detent of the spring loaded lever 62 engages in the cut-out portion 60 to lock the valve in the "on" position. Air is thereupon admitted to the rear of cylinder 15 pushing its piston forward to move the platform to the left and thereby drawing the strip with it due to its adherence to the leading face of the block. The displacement of the platform corresponds to the desired thickness of one slice.

When the piston rod of cylinder 15 has reached its extreme outward position, trip bar 21 actuates pilot valve 22. This causes air to be supplied to the front end (i.e. the left end in FIG. 6) of air cylinder 48 whereupon its piston moves to the right to rotate radius arm 42 counter-clockwise, thereby causing the rotary cutter 8 to sever the strip 3 on or just above the upper face of the block. The pressure roller 6, by clamping the strip against the blade helps to keep the strip in position during the cutting operation. It will be noted that due to the gearing effect which takes place between the knurled bush 37 and the strip 64 in track 38, the peripheral speed of the rotary cutter 8 is greater than the linear speed of spindle 35. This facilitates the severing action. The rotary cutter is positioned from the blade 7 by a distance not greater than the distance of advancement so leaving an amount of the strip projecting beyond the blade.

When the radius arm reaches the end of its severing stroke, it trips pilot valve 63. Tripping of pilot valve 63 causes air to be supplied to the rear end (i.e. the upper end in FIG. 6) of air cylinder 31, whereupon the blade 7 moves downwards. This releases pilot valve 33 which causes air to be supplied to the front end of cylinder 15, which thereupon will begin its return stroke. The platform is retained in its position by the locating device. The return stroke of the piston of cylinder 15 releases pilot valve 22 which causes air to be supplied to the rear end of cylinder 48 thereby returning the radius arm 42 to its original position.

During its downward movement, the blade 7 nips the strip between itself and the margarine and slices through the margarine, drawing with it the strip which unrolls from the roll 4. If desired, the pressure roller may be held away from the blade 7, during the first 1.27 cm. of its downward movement by wedges (not shown) secured to the blade 7. Thereafter the roller nips the strip between itself and the blade and "rolls" the strip on to the blade. The line joining the axis of pressure roller 6 and its pivot makes an angle of about 60° to the vertical thereby causing the roller to exert pressure against the strip. If desired a spring could be used instead of gravity.

When the blade 7 has reached the end of its travel, pilot valve 34 is depressed causing air to be supplied to the front end of cylinder 31 which thereupon returns the blade 7 to its original, upper position. During the upward movement of the blade 7, the strip remains sandwiched between the slice and the remainder of the block. The slice is prevented from ascending with the blade by plate 40, and the block by studs 10. If desired an angle piece can be secured to the top of back rest 9 instead of or in addition to the studs 10. On returning, pilot valve 33 is tripped and the cycle recommences, i.e. air is supplied to the back end of the cylinder 15 and the platform is advanced to the left, etc.

The process is repeated until the whole block of margarine is sliced and interleaved, whereupon arm 65 fixed to block 11 trips pivoted lever 62 to release the disc 58. Thereupon the valve 55 is urged to its "off" position by means of a spring (not shown).

The dimensions of the block of margarine were 30.5 cm. x 19.1 cm. x 20.3 cm. and the block was so disposed on platform 2 that it was sliced by the blade 7 parallel to the 30.5 cm. x 19.1 cm. face into eight 2.54 cm. slices. The weight of the block was 12.7 kg. The cutter wheel 8 was disposed 1.27 cm. from the blade 7.

We claim:

1. A machine for slicing and interleaving a plastic substance in the form of a bar comprising support means for supporting the bar, a reciprocable blade, advancing means for intermittently causing relative displacement between the bar and the blade so that the leading surface of the unsliced part of the bar is moved a predetermined distance past one side of the blade, means for reciprocating the blade after operation of the advancing means to cut a slice from the unsliced part of the bar and to insert interleaving sheet material in the cut, severing means for severing the interleaving sheet material after operation of the advancing means but before the next reciprocation of the blade, the operating part of the severing means being disposed on said one side of the blade and spaced therefrom by a distance not greater than the predetermined distance.

2. A machine as claimed in claim 1 in which the severing means comprises a cutter wheel, means for rotating the cutter wheel, and means for moving the cutter wheel in a direction transverse to the direction of advancement.

3. A machine as claimed in claim 2 in which the means for rotating and the means for moving the cutter wheel are such that during the severing operation the peripheral speed of the cutter wheel relative to its axis is greater than the speed of movement of its axis.

4. A machine for slicing and interleaving plastic substance in the form of a bar comprising support means for supporting the bar, a reciprocable blade, advancing the block so that its leading face, which has a strip of vegetable parchment adhering thereto, passes a blade and draws more of the strip from a supply of the strip past the blade, severing the strip in a position between the leading face of the unsliced portion and the blade, moving the blade to cut a slice from the unsliced portion and to draw a part of the strip from the supply into the cut, withdrawing the blade whilst leaving said part of the strip in the cut adhering to the new leading face of the unsliced portion, and thereafter repeating the cycle of operations.

18. A method of slicing and interleaving a block of edible fat comprising advancing the unsliced portion of the block so that its leading face, which has adhering thereto a strip comprising two distinct layers of vegetable parchment, passes a blade and draws more of the strip from a supply of the strip past the blade, severing the strip in a position between the leading face of the unsliced portion and the blade, moving the blade to cut a slice from the unsliced portion and to draw a part of the strip from the supply into the cut, withdrawing the blade whilst leaving said part of the strip in the cut adhering to the new leading face of the unsliced portion, and thereafter repeating the cycle of operations.

References Cited in the file of this patent

UNITED STATES PATENTS

| | | |
|---|---|---|
| 1,503,355 | Ekstrom et al. | July 29, 1924 |
| 1,592,793 | Webster | July 13, 1926 |
| 1,596,514 | Anderson | Aug. 17, 1926 |
| 1,975,936 | Goodwin | Oct. 9, 1934 |
| 2,023,122 | Chandler | Dec. 3, 1935 |
| 2,497,203 | Bennett | Feb. 14, 1950 |
| 2,509,450 | Reed et al. | May 30, 1950 |
| 2,813,798 | Toby | Nov. 19, 1957 |
| 2,845,763 | Wonsidler | Aug. 5, 1958 |